United States Patent
Cole et al.

(10) Patent No.: US 12,245,572 B2
(45) Date of Patent: *Mar. 11, 2025

(54) AUTOMATED CHICKEN SORTING CONVEYOR BELT

(71) Applicant: Hatchery Planning, Inc., Powder Springs, GA (US)

(72) Inventors: Steven Meriwether Cole, Acworth, GA (US); Garland Alan Vaughn, II, Dallas, GA (US); Zachary Adam Chance, Cartersville, GA (US)

(73) Assignee: Hatchery Planning, Inc., Powder Springs, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/455,347

(22) Filed: Aug. 24, 2023

(65) Prior Publication Data

US 2023/0397579 A1 Dec. 14, 2023

Related U.S. Application Data

(63) Continuation of application No. 17/015,684, filed on Sep. 9, 2020, now Pat. No. 11,758,885.

(60) Provisional application No. 62/897,678, filed on Sep. 9, 2019.

(51) Int. Cl.
| | |
|---|---|
| *A01K 45/00* | (2006.01) |
| *A01K 29/00* | (2006.01) |
| *B65G 15/26* | (2006.01) |
| *B65G 21/20* | (2006.01) |
| *B65G 23/44* | (2006.01) |
| *B65G 47/44* | (2006.01) |

(52) U.S. Cl.
CPC ............ *A01K 45/005* (2013.01); *A01K 29/00* (2013.01); *B65G 15/26* (2013.01); *B65G 21/2081* (2013.01); *B65G 23/44* (2013.01); *B65G 47/44* (2013.01); *B65G 2203/044* (2013.01)

(58) Field of Classification Search
CPC ...... A01K 45/005; A01K 29/00; B65G 15/26; B65G 21/2081; B65G 23/44; B65G 47/44; B65G 2203/044; B65G 21/14
See application file for complete search history.

(56) References Cited

U.S. PATENT DOCUMENTS

| | | | |
|---|---|---|---|
| 3,722,477 A | 3/1973 | Weldy | |
| 4,037,565 A | 7/1977 | Ledwell, Jr. | |
| 4,668,488 A | 5/1987 | Ranke | |
| 4,736,710 A * | 4/1988 | Nicolai | A01K 45/005 119/846 |
| 5,660,147 A * | 8/1997 | Wills | A01K 45/005 119/846 |

(Continued)

OTHER PUBLICATIONS

U.S. Office Action for U.S. Appl. No. 17/015,684, mailed on Oct. 19, 2022, Cole, "Automated Chicken Sorting Conveyor Belt", 8 Pages.

*Primary Examiner* — Mark A Deuble
(74) *Attorney, Agent, or Firm* — Lee & Hayes, P.C.

(57) ABSTRACT

Technologies are described herein for an automated chicken sorting conveyor belt system. Conveyor belts that move chicks from a loading area into bins move laterally (or horizontally) as the chicks fill up the bins. This reduces various impact, acceleration, and other forces imparted on the chicks.

10 Claims, 10 Drawing Sheets

(56) References Cited

U.S. PATENT DOCUMENTS

| | | |
|---|---|---|
| 6,880,488 B1 * | 4/2005 | Hall ..................... A01K 45/005 |
| | | 119/846 |
| 7,281,496 B2 | 10/2007 | Calabria |
| 8,176,879 B1 * | 5/2012 | Anderson ............ A01K 45/005 |
| | | 119/846 |
| 9,055,734 B1 | 6/2015 | Anderson |
| 11,758,885 B2 * | 9/2023 | Cole .................. B65G 21/2081 |
| | | 119/713 |
| 2002/0179024 A1 | 12/2002 | Anderson |
| 2021/0068374 A1 | 3/2021 | Cole et al. |

* cited by examiner

AUTOMATED CHICKEN SORTING CONVEYOR BELT

CROSS REFERENCE TO RELATED APPLICATIONS

This application is a continuation of co-pending U.S. application Ser. No. 17/015,684 filed Sep. 9, 2020, which claims the benefit of U.S. Provisional Application No. 62/897,678 filed Sep. 9, 2019 entitled "Automated Chicken Sorting Conveyor Belt," which are hereby incorporated herein by reference in their entirety.

BACKGROUND

The conditions chickens are placed under during their entire lifecycle are undergoing increasing scrutiny in the chicken production industry. Companies are finding ways to reduce additives being introduced into the chicken, as well as, and just as importantly, finding humane ways to treat the chicken during the various phases in that lifecycle.

It is with respect to these and other considerations that the disclosure made herein is presented.

SUMMARY

Technologies are described herein for an automated chicken sorting conveyor belt system. The conveyor belt system of the presently disclosed subject matter provides a system in which a chick is moved into bins after being separated from their egg shell debris. In some examples, the conveyor belt system of the presently disclosed subject matter provides a constant or near constant fall distance from the conveyor belt to a bin. In some examples, the conveyor belt system of the present disclosure reduces the force on chicks as the chicks move from the conveyor belt to the bins used to transport the chicks.

This Summary is provided to introduce a selection of technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for an automated chicken sorting conveyor belt system.

After chicks are separated from their egg shell debris, the chicks are loaded into bins for transport to a farm or other facility for further processing, such as raising the chicks until ready for meat processing. In conventional conveyor systems, chicks are moved along conveyors at relatively high speed. To put the chicks into bins for transport, the chicks are essentially "shot" into curved chutes or channels that change the direction of the chick from a horizontal movement from a loading area to a diagonal or vertical movement where the bin is.

During the process of changing the direction of the chick from a horizontal movement to a diagonal or vertical movement, the chick undergoes forces similar to forces a human would experience in a car that changes direction at a high rate of speed. Further, in order to accommodate movement of the curved tubes or chutes, conventional conveyor systems require a relatively significant distance between the bottom of the bin and the edge of the conveyor, sometimes 8 inches or more. Therefore, in conventional conveyor systems, not only do the chicks experience relatively significant g-forces from the change in direction at a high rate of speed, but also experience a relatively long period of acceleration caused by gravity as the distance from the conveyor belt and bottom of the bin is relatively long.

In various examples, the presently disclosed subject matter provides for an automated chicken sorting conveyor belt system. The system includes one or more conveyor belts designed to receive the chicks from the sorting process and move the chicks into a bin for transport. The conveyor belt is designed to move laterally (or horizontally) as the bin fills up. The edge of the conveyor belt is placed proximate to the top of a bin near a first area of the bin. As the bin fills up, the conveyor belt moves laterally so that the edge of the conveyor belt is positioned above a second area of the bin, completing the filling process of the bins. The bin, once filled to a desired level, is moved and, simultaneously, another bin is placed beneath the conveyor belt as the conveyor belt is moved back to the first position. The chicks are allowed to fall the relatively short distance from the conveyor belt without the need for a curved tube or chute.

In the following detailed description, references are made to the accompanying drawings that form a part hereof, and in which are shown by way of illustration specific examples. Referring now to the drawings, aspects of technologies for an automated chicken sorting conveyor belt system will be presented.

Figure 1:
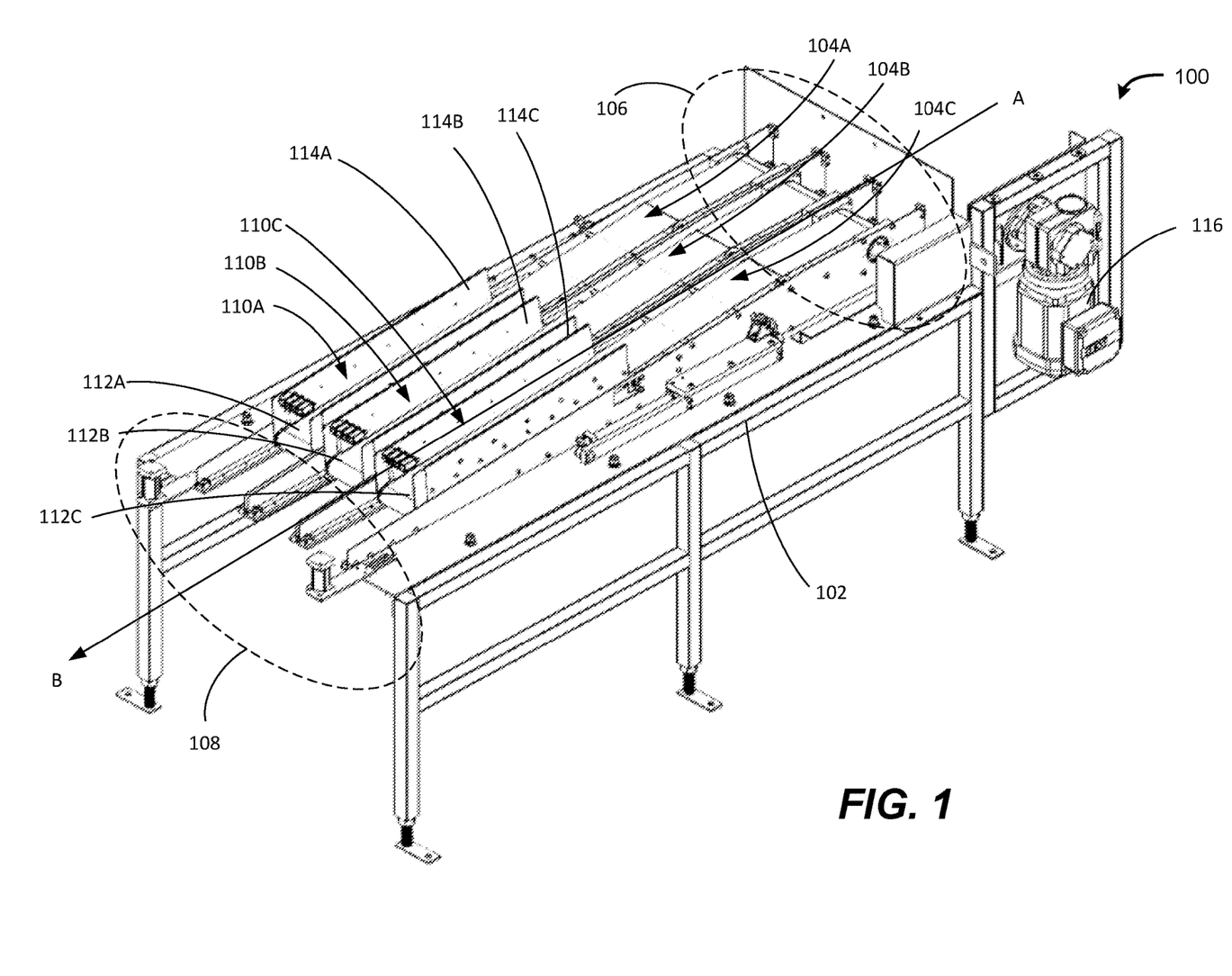
FIG. 1 is an illustration of an automated chicken sorting conveyor belt system, according to various examples.

FIG. 1 is an illustration of an automated chicken sorting conveyor belt system 100. The automated chicken sorting conveyor belt system 100 includes a stand 102. The stand 102 is used to support the various components of the automated chicken sorting conveyor belt system 100. The stand 102 may be metal or other suitable material that can support the various components of the automated chicken sorting conveyor belt system 100. The automated chicken sorting conveyor belt system 100 further includes chutes 104A-104C (hereinafter referred to collectively as the "chutes 104"). The chutes 104 are designed to move chicks (not pictured) from a loading area 106 to a bin area 108. The bins (illustrated in FIG. 2A) are loaded onto vehicles to transport the chicks.

The chicks are loaded onto conveyors 110A-110C (hereinafter referred to collectively as the "conveyors 110") of the chutes 104A-104C, respectively. It should be noted that although three conveyors 110 are illustrated, various examples of the presently disclosed subject matter may include more than three or less than three conveyors 110, all of which are considered to be within the scope of the presently disclosed subject matter. The conveyors 110 include conveyor belts 112A-112C (hereinafter referred to collectively as the "conveyor belts 112") and conveyor separators 114A-114C (hereinafter referred to collectively as the "conveyor separators 114"). The conveyor belts 112 are rotated generally in the direction of A to B on the top and B to A on the bottom, moving chicks from the loading area 106 to the bin area 108. The conveyor belts 112 are moved by motor 116. The motor 116 can be rotatably engaged to one or more of the conveyor belts 112. The conveyor separators 114 are configured to provide a barrier between the conveyor belts 112 to prevent chicks from falling off the conveyor belts 112 or moving from one of the conveyor belts 112 to another one of the conveyor belts 112.

Figure 2A:
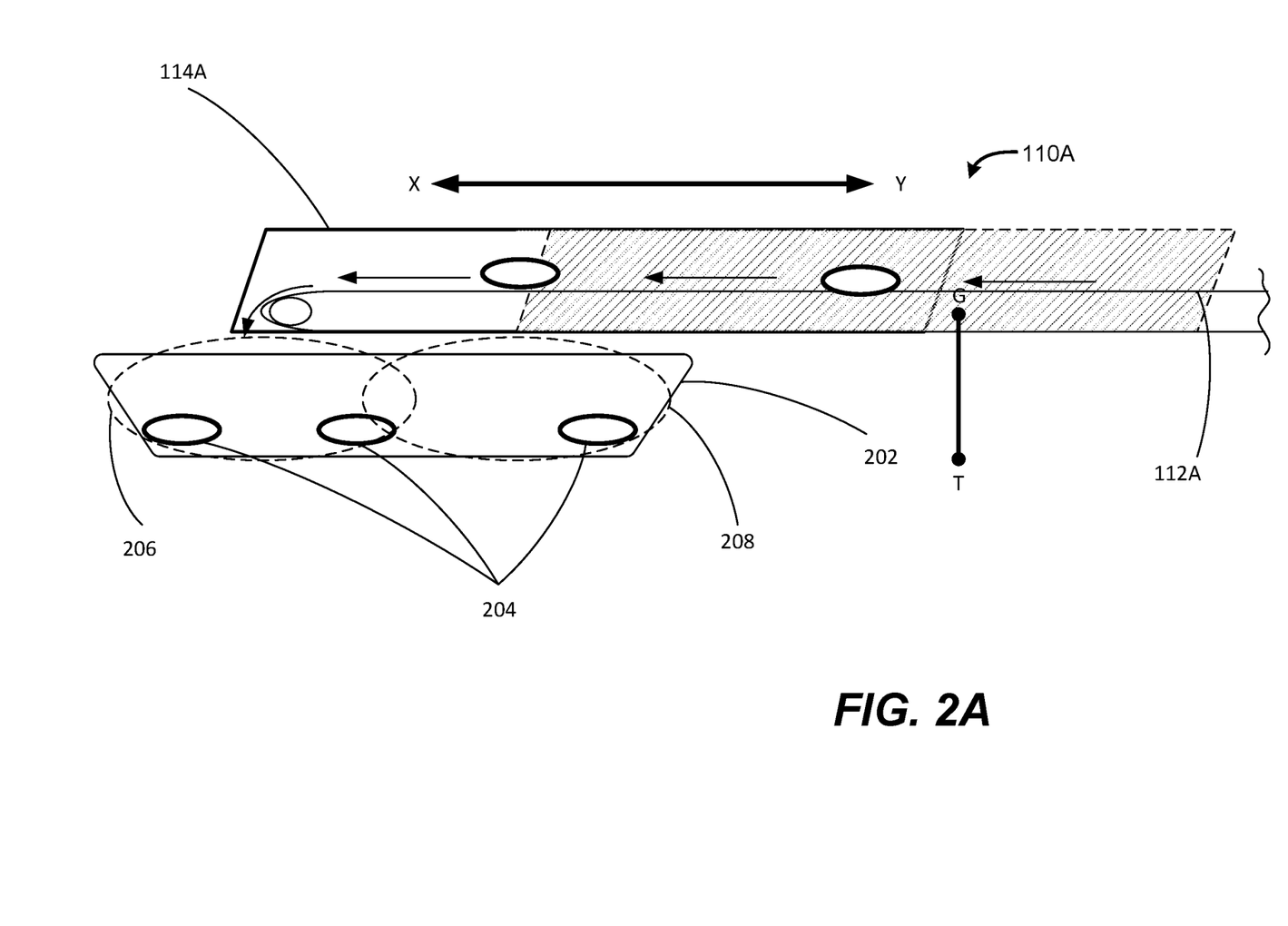
FIG. 2A is a partial sideview illustration of a conveyor, in accordance with various examples disclosed herein.

FIG. 2A is a partial sideview illustration of the conveyor 110A. Shown are the conveyor belt 112A and the conveyor separator 114A. As described above, during use, the conveyors 110, such as the conveyor 110A illustrated in FIG. 2A, move laterally to fill a bin, such as a bin 202 of FIG. 2A, with chicks 204. The conveyor 110A moves laterally in the direction of line XY towards location X and then towards location Y, providing a back and forth motion. The conveyor 110A may move laterally for various reasons. In some examples, the conveyor 110A (as well as conveyors 110B and 110C) may move laterally based on a number of chicks 204 that have been placed in the bin 202. For example, a counting mechanism may be employed that counts the chicks 204 being deposited into the bin 202 in one area, and then moves the conveyor 110A to allow chicks 204 to be deposited into the bin 202 in another area once a certain number of chicks 204 have been deposited in the first area. In other examples, the conveyor 110A may be moved based on a weight of the chicks 204 in a certain area or in the bin 202 overall. In another example, an optical density sensor can be employed. The optical density sensor can be positioned at a location that allows the sensor to look at the chicks 204 in the bin and determine, based on a counting of the chicks, a density of the chicks 204 in that area of the bin. This may be useful in some examples because the chicks 204 may be of various sizes and thus the density of the chicks may vary from bin to bin even though the count may be the same. The presently disclosed subject matter is not limited to any particular technology or reason for moving the bin 202.

The bin 202 includes a front area 206 and a rear area 208. The conveyor 110A moves laterally along line XY towards position X to deposit chicks 204 initially in the front area 206 and then, when the front area 206 is full or determined to be full, moves laterally along line XY to position Y to deposit chicks 204 in the rear area 208. In some examples, the conveyor 110A continues to rotate the conveyor belt 112A as the conveyor 110A moves from position X to position Y, and vice versa. It should be noted that although FIG. 2A shows two areas, the front area 206 and the rear area 208, the presently disclosed subject matter is not limited to two areas, as the bin 202 may be continually moved as the chicks are deposited into the bin 202, or there may be one area, or more than two areas.

As shown in FIG. 2A, during the entire time the chicks 204 are being deposited into the bin 202, the height from which the chicks 204 fall from the conveyor belt 112A to the bin 202 remains relatively constant, illustrated by line GT. Further, while the conveyor 110A is moved from position X to position Y, or from position Y to position X, the chicks 204 experience relatively little, if any, difference in velocity during and after the movement. In other words, the chicks 204 deposited in the front area 206, the rear area 208, and while the conveyor 110A is moving between position X and position Y experience generally the same g-forces and gravitational acceleration.

Figure 2B:
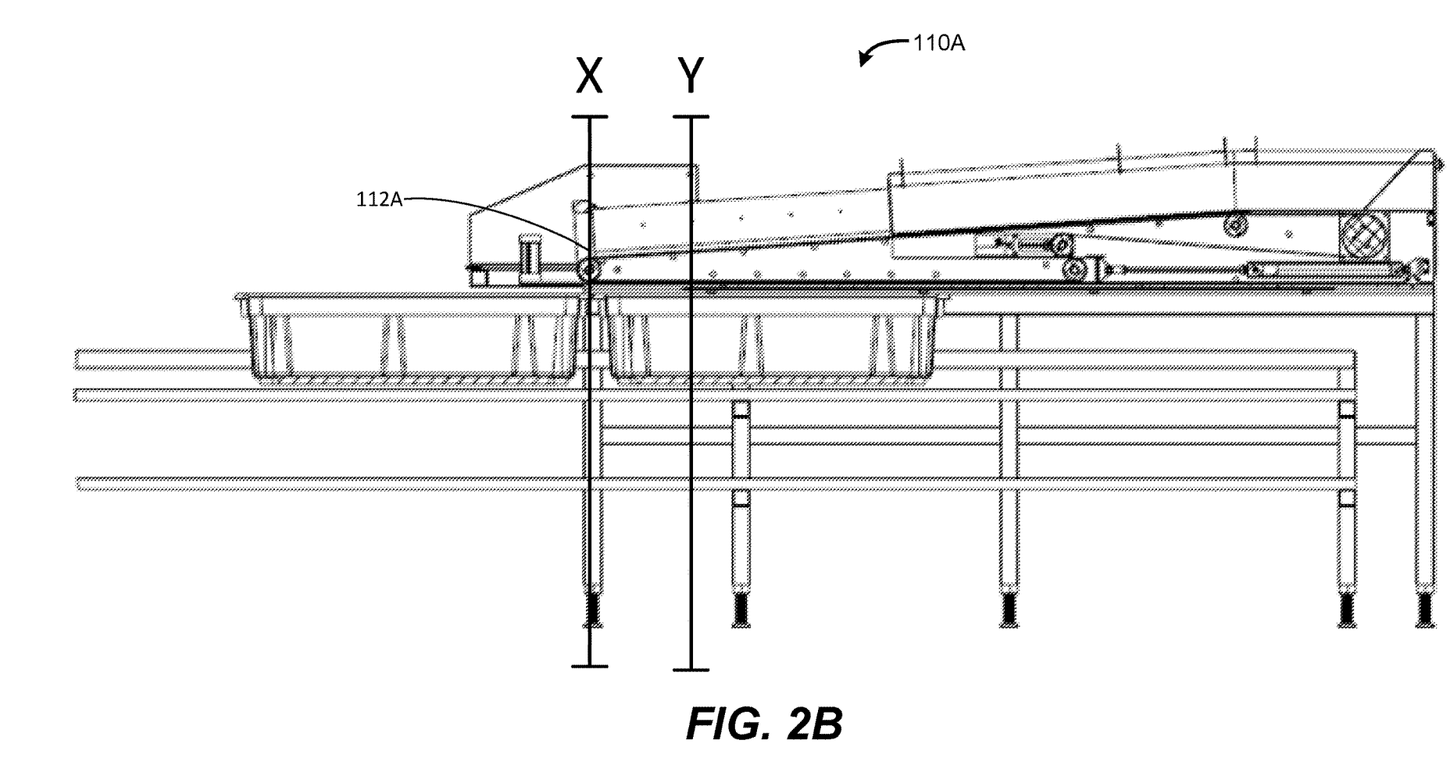
FIGS. 2B and 2C are partial sideview illustrations of a conveyor in an extended position and a retracted position.
Figure 2C:
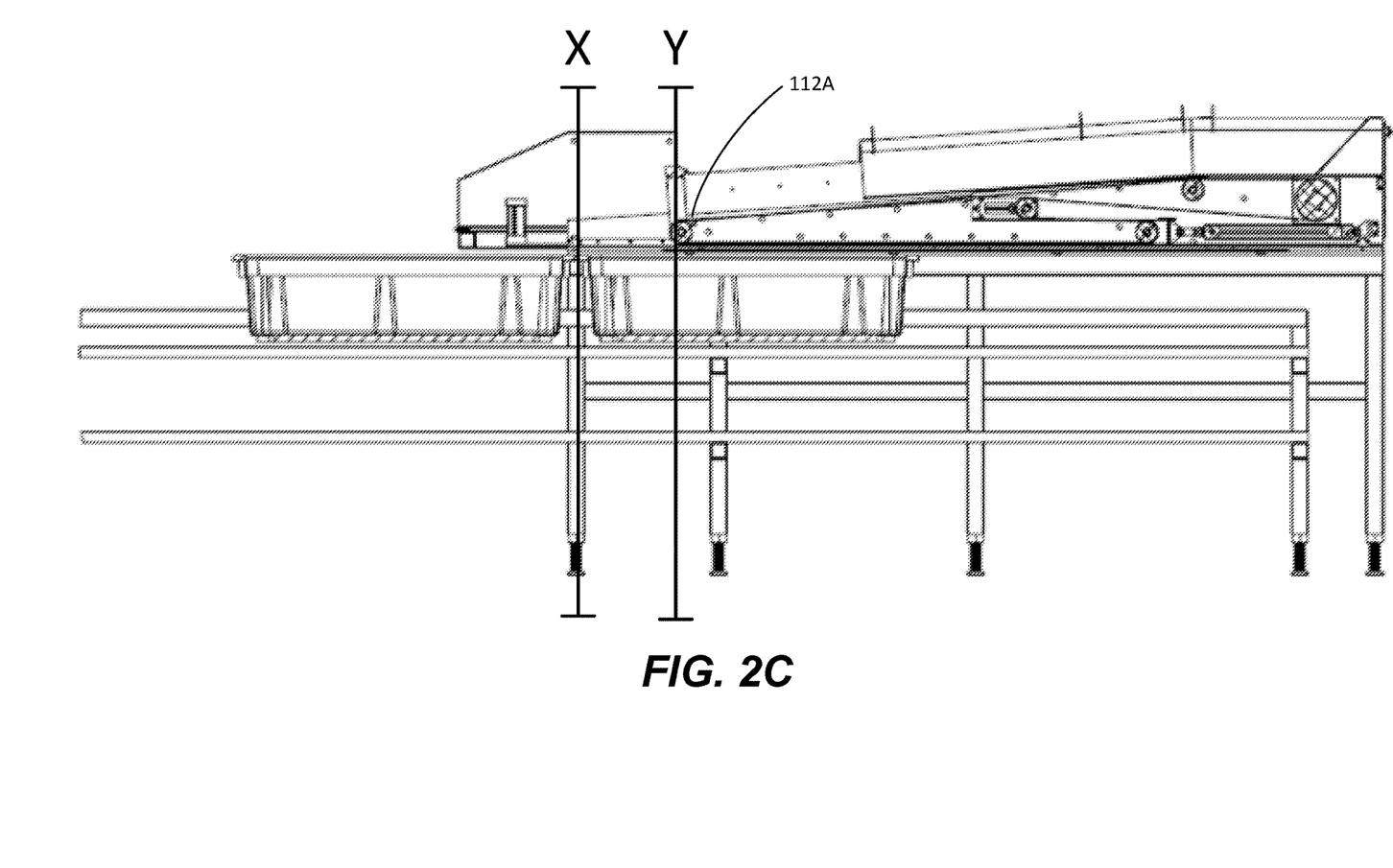

FIG. 2B is a sideview illustration of the automated chicken sorting conveyor belt system 100 in an extended position. As illustrated, the conveyor 110A is shown with the conveyor belt 112A extended to a forward or extended position X. FIG. 2C is a sideview illustration of the automated chicken sorting conveyor belt system 100 in a rear or retracted position Y. As illustrated, the conveyor 110A is shown with the conveyor belt 112A retracted to a position Y from the position X of FIG. 2B. As noted above, the presently disclosed subject matter is not limited to two positions or areas for filling. In some examples, the bin 202 may be moved continuously during the deposition of the chicks into the bin. Further, the chicks may be deposited in one area, or more than two areas. These and other configurations are considered to be within the scope of the presently disclosed subject matter.

Figure 3:
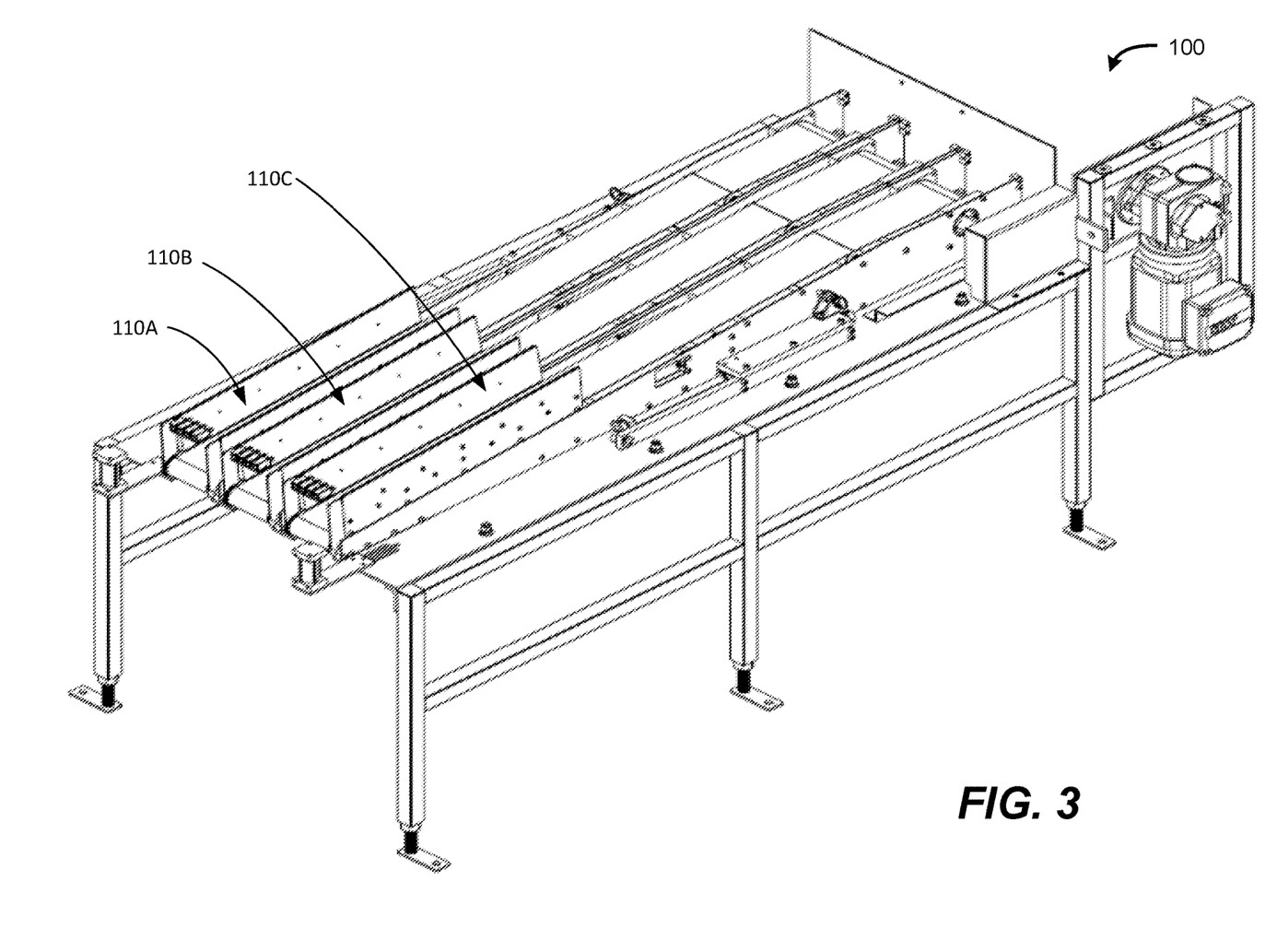
FIGS. 3-5 illustrate conveyors in different positions, in accordance with various examples disclosed herein.
Figure 4:
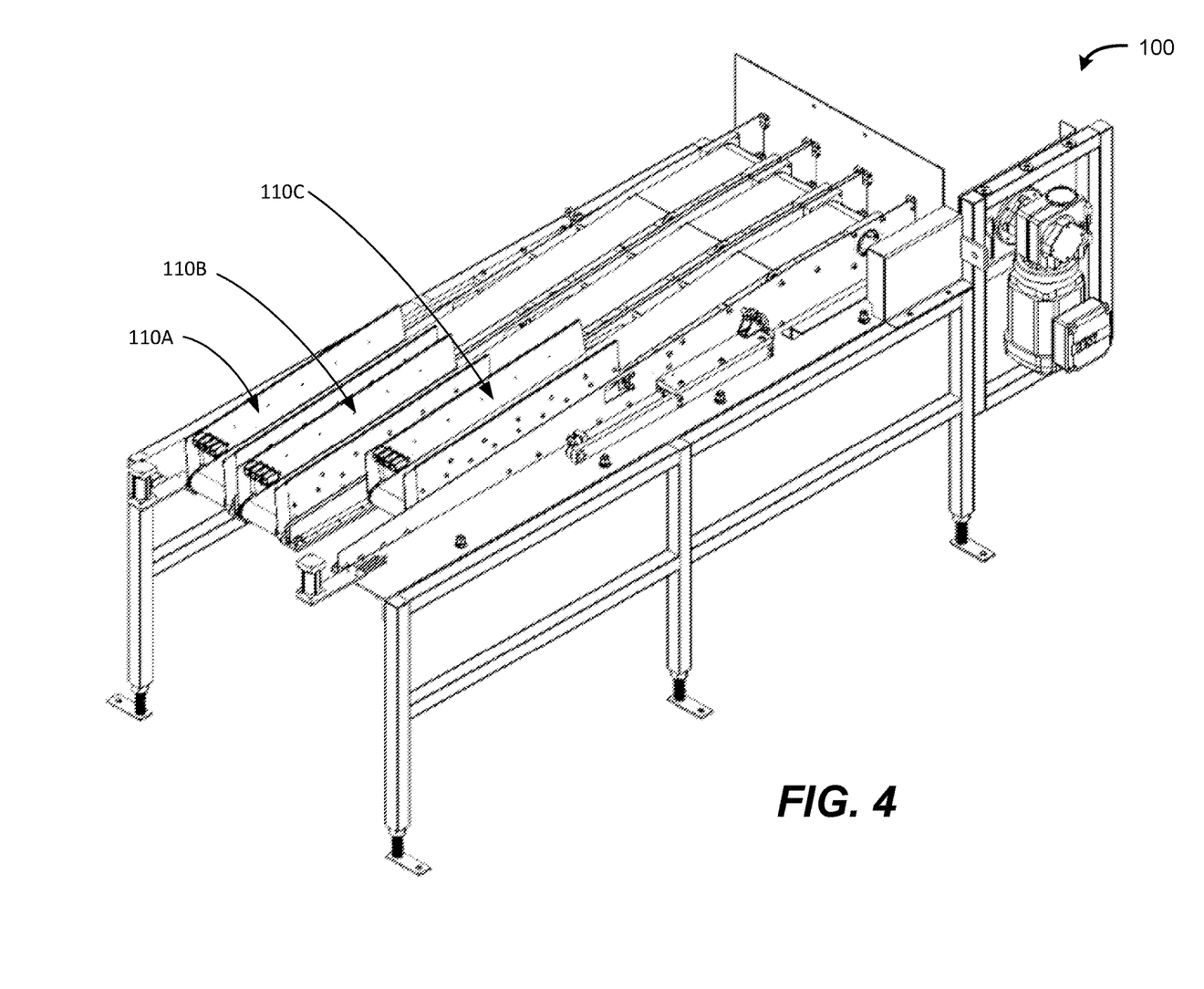
Figure 5:
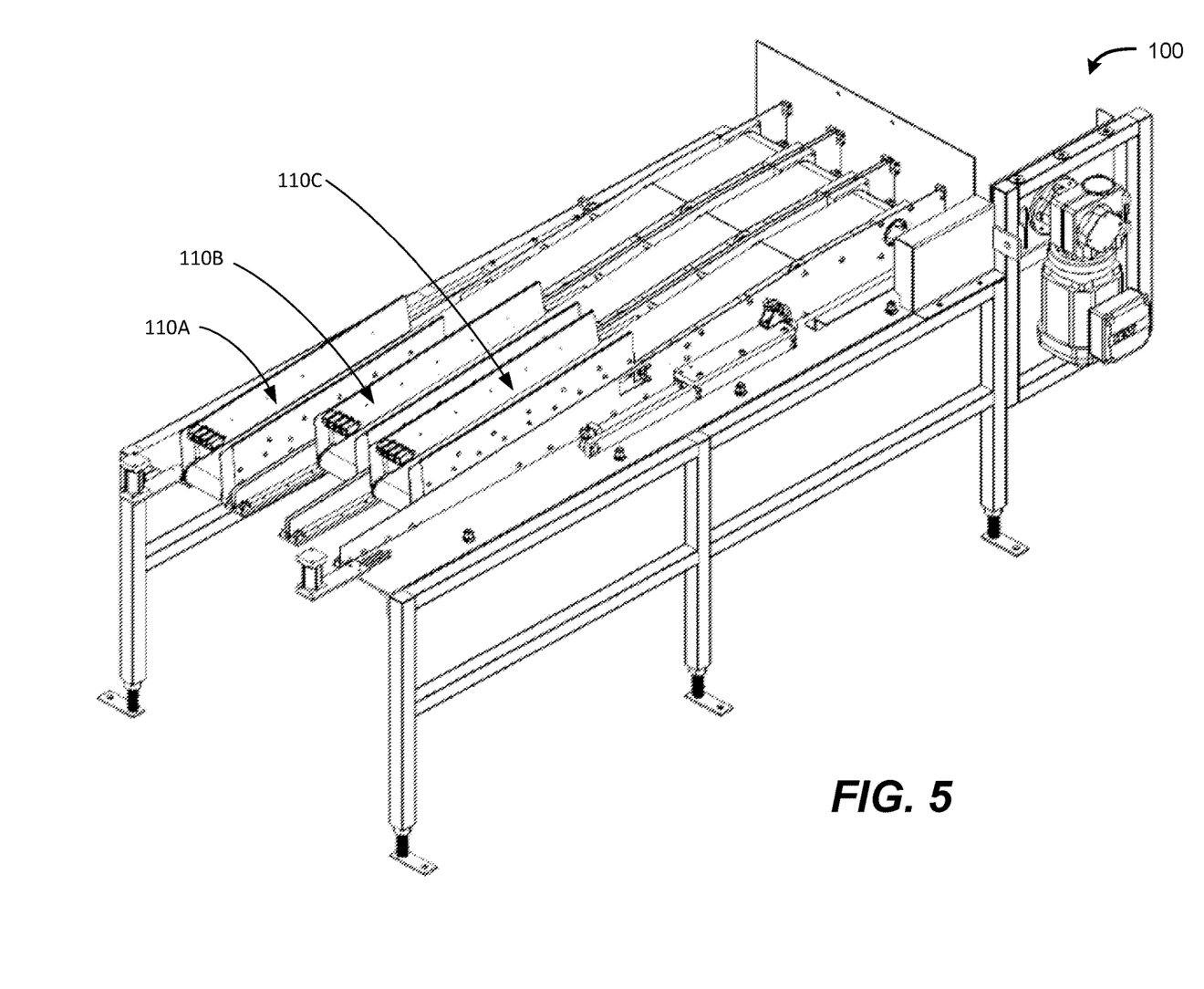

FIGS. 3-5 illustrate the conveyors 110 in different positions. In FIG. 1, the conveyors 110 are illustrated as all being in a rear or retracted position. In FIG. 3, the conveyors 110 are illustrated as all being in a forward or extended position. In FIG. 4, the conveyors 110A and 110B are illustrated as being in a forward position, while the conveyor 110C illustrated as being in a rear position. In FIG. 5, the conveyors 110B and 110C are illustrated as being in a rear position and the conveyors 110A are illustrated as being in a forward position. As illustrated by the various positions of the conveyors in FIGS. 1, 3, 4, and 5, the conveyors 110 can be moved individually, together, or in various configurations.

Figure 6:
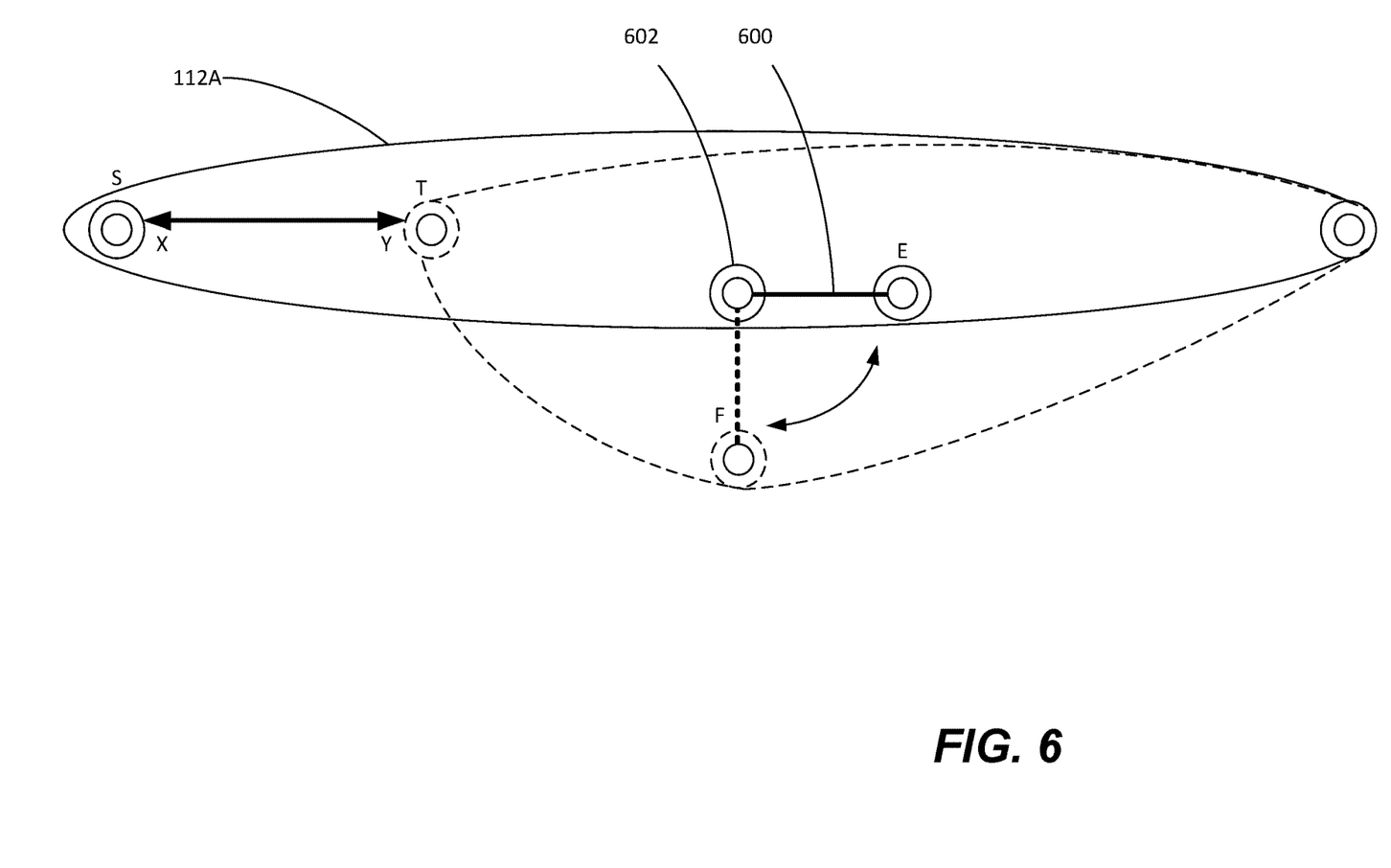
FIG. 6 illustrates a conveyor belt tensioner that may be used to maintain tension on a conveyor belt, in accordance with various examples disclosed herein.

FIG. 6 illustrates a belt tensioner 600 for a conveyor that may be used to maintain tension on a conveyor belt, such as the conveyor belt 112A of FIG. 1, as the conveyor 110A is moved from a forward position to a rear position, and from a rear position to a forward position. The belt tensioner 600 moves between position E to position F to maintain a tension on the conveyor belt 112A as the conveyor belt moves from position S to position T. When the conveyor belt 112A is at position S, the belt tensioner 600 is at position E. In this configuration, when the conveyor belt 112A is fully extended, the belt tensioner 600 does not need to provide much, if any, tension on the conveyor belt 112A. In some examples, the belt tensioner 600 will provide some tension when the conveyor belt is at position S. When the conveyor belt 112A moves to position T, the belt tensioner 600 moves to position F. In this configuration, when the conveyor belt 112A is fully retracted, the belt tensioner 600 provides sufficient tension on the conveyor belt 112A to keep the conveyor belt 112A taut.

In some examples, the belt tensioner 600 is rotatable affixed to tensioner pivot 602. The tensioner pivot 602 rotates when the conveyor belt 112A is moved from position S to position T, or from position T to position S, to move the belt tensioner 600 into the correct position. The tensioner pivot 602 may be rotated in coordination with the movement of the conveyor belt 112A using various mechanical or electromechanical technologies known to those of ordinary skill in the relevant art.

Figure 7A:
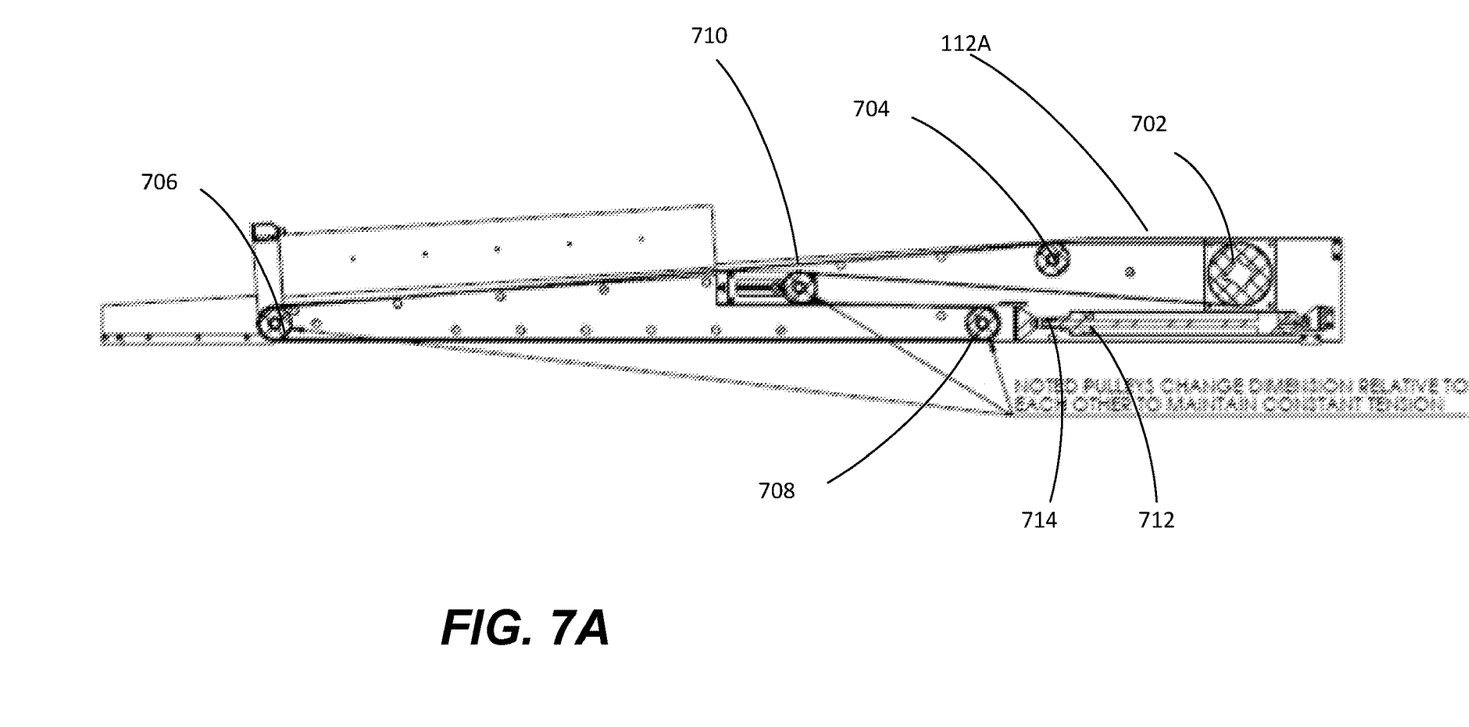
FIGS. 7A and 7B illustrate another example of a conveyor belt tensioner that may be used to maintain tension on a conveyor belt, in accordance with various examples disclosed herein.
Figure 7B:
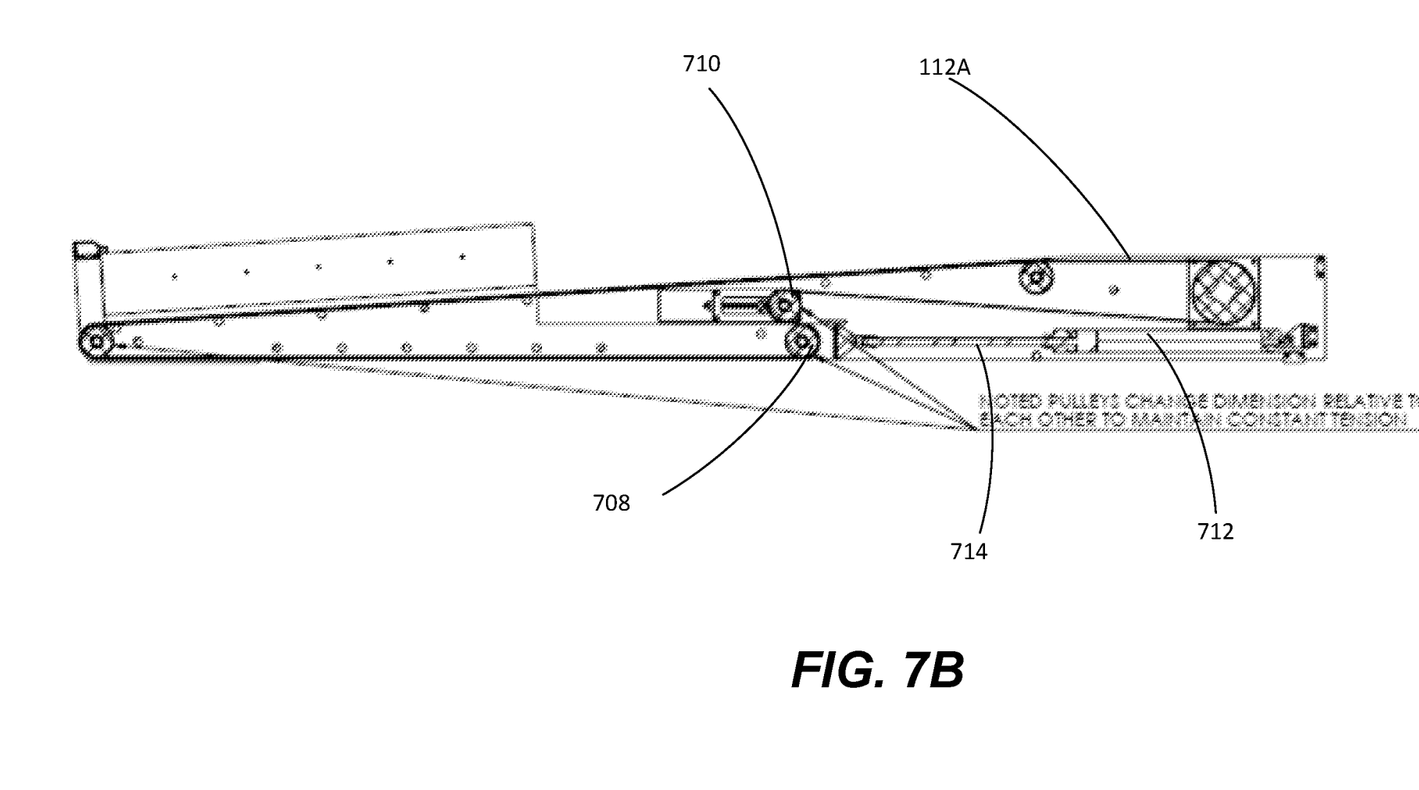

FIGS. 7A and 7B are side view illustrations of another example of a belt tensioner to maintain tension on a conveyor belt, such as the conveyor belt 112A of FIG. 1. In FIG. 7A, the conveyor belt 112A is rotated by roller 702 which is rotated by a motor, such as the motor 116 of FIG. 1. The conveyor belt 112A is moved over rollers 704 then to roller 706, and then onto roller 708, around roller 710, and then back to the roller 702 to complete a circuit.

To maintain tension on the conveyor belt 112A as it moves from a retracted position illustrated in FIG. 7A to an extended position as illustrated in FIG. 7B, a belt tensioner 712 is used. The belt tensioner 712 includes an extension rod 714 that extends and retracts to move the position of roller 708 with respect to the position of the roller 710. The movement towards and from the roller 710 maintains the tension on the conveyor belt 112A. FIG. 7B shows the extension rod 714 in an extended position. The extended position moves the roller 708 laterally forward towards the roller 710. While the length of the conveyor belt 112A is maintained constant, the change of the relative distance between the roller 710 and the roller 708 changes the track length of the conveyor belt 112, allowing a consistent tension on the conveyor belt 112A to be maintained.

Based on the foregoing, it should be appreciated that technologies for an automated chicken sorting conveyor belt system have been disclosed herein. Although the subject matter presented herein has been described in language specific to structural features, methodological and transformative acts, and specific machinery, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example configurations and applications illustrated and described, and without departing from the true spirit and scope of the present invention, aspects of which are set forth in the following claims.

The invention claimed is:

1. A sorting system, comprising:
   a first conveyor belt configured to receive a first chick and a second chick from a sorting process, the first conveyor belt having a first lateral position configured to deposit the first chick in a first area of a bin and a second lateral position configured to deposit the second chick in a second area of the bin, wherein the first lateral position and the second lateral position are a same height above the bin;
   the bin to receive the first chick in the first area and the second chick in the second area from the first conveyor belt; and
   an optical density sensor configured to determine an amount of chicks to move the bin from the first lateral position to the second lateral position.

2. The sorting system of claim 1, wherein the first conveyor belt further comprises a chute.

3. The sorting system of claim 1, wherein the first conveyor belt further comprises at least one conveyor separator to maintain the first chick on the first conveyor belt.

4. The sorting system of claim 1, further comprising:
   a plurality of second conveyor belts, each of the plurality of second conveyor belts configured to:
   move to a plurality of third lateral positions to deposit a plurality of third chicks in a third area of a second bin; and
   laterally move to a plurality of fourth lateral positions to deposit a plurality of fourth chicks in a fourth area of the second bin.

5. The sorting system of claim 1, wherein the bin comprises a third area, wherein the third area is between the first area and the second area.

6. The sorting system of claim 1, further comprising a belt tensioner to maintain a tension of the first conveyor belt from the first lateral position to the second lateral position.

7. A method of sorting chickens, the method comprising:
   moving a first conveyor belt to a first lateral position to deposit a first chick in a first bin area of a first bin at a first bin location, wherein an edge of the first conveyor belt is proximate to a top of the first bin at the first bin area, wherein the first bin area is located to receive the first chick from the first conveyor belt;
   determining, using a chick counter, an amount of chicks to move the first bin from the first lateral position to a second lateral position;
   moving, based on the determining using the chick counter, the first conveyor belt laterally from the first lateral position to the second lateral position to deposit a second chick in a second bin area of the first bin, wherein the first lateral position and the second lateral position are a same height above the first bin; and
   moving a second bin to the first bin location and moving the first conveyor belt to the first lateral position to deposit a third chick in a first bin area of the second bin at the first bin location, wherein the edge of the first conveyor belt is proximate to the top of the second bin at the first bin area of the second bin, wherein the first bin area of the second bin is located to receive the third chick from the first conveyor belt.

8. The method of claim 7, further comprising:
   moving a plurality of second conveyor belts to the first lateral position to deposit a plurality of fourth chicks in the first bin area of the first bin, wherein each of a plurality of edges of the plurality of second conveyor belts are proximate to a top of the first bin at the first bin location, wherein the first bin location is located to receive the plurality of fourth chicks from each of a plurality of edges of the plurality of second conveyor belts; and
   moving the plurality of second conveyor belts laterally from the first lateral position to the second lateral position to deposit a plurality of fifth chicks in the second bin lateral location of the first bin, wherein the first lateral position and the second lateral position are a same height above the first bin.

9. The method of claim 8, further comprising providing a plurality of conveyor separators between the first conveyor belt and the plurality of second conveyor belts.

10. The method of claim 7, further comprising maintaining a tension on the first conveyor belt as the first conveyor belt moves laterally from the first lateral position to the second lateral position.

* * * * *